United States Patent [19]

Broer et al.

[11] Patent Number: 4,904,051

[45] Date of Patent: Feb. 27, 1990

[54] OPTICAL FIBER PROVIDED WITH A SYNTHETIC RESIN COATING

[75] Inventors: Dirk J. Broer; Cornelis M. G. Jochem; Theodorus M. Meeuwsen; Daniel C. L. Vangheluwe, all of Eindhoven, Netherlands

[73] Assignee: U.S. Philips Corp., New York, N.Y.

[21] Appl. No.: 251,631

[22] Filed: Sep. 29, 1988

[30] Foreign Application Priority Data

Oct. 8, 1987 [NL] Netherlands ............... 8702395

[51] Int. Cl.$^4$ .................................................. G02B 6/10
[52] U.S. Cl. ................................. 350/96.30; 350/96.23
[58] Field of Search ............... 350/96.23, 96.29, 96.30, 350/96.34; 428/373, 374, 375, 391, 392; 427/35, 44, 163

[56] References Cited

U.S. PATENT DOCUMENTS

| | | | |
|---|---|---|---|
| 4,213,672 | 7/1980 | Aulich et al. | 350/96.23 |
| 4,239,335 | 12/1980 | Stiles | 350/96.23 |
| 4,718,748 | 1/1988 | Broer et al. | 350/96.30 |
| 4,733,941 | 3/1988 | Broer et al. | 350/96.33 |
| 4,738,509 | 4/1988 | Broer et al. | 350/96.34 |
| 4,741,596 | 5/1988 | Broer et al. | 350/96.34 |
| 4,741,597 | 5/1988 | Broer | 350/96.34 |
| 4,763,981 | 8/1988 | Wilkins | 350/96.23 |

Primary Examiner—Frank Gonzalez
Attorney, Agent, or Firm—Ernestine C. Bartlett

[57] ABSTRACT

An optical fiber provided with a synthetic resin coating, comprising a glass fibre, a first enveloping layer of a synthetic rubber having a modulus of elasticity from 0.1 to 10 MPa and a subsequent enveloping layer of a synthetic resin having a larger modulus of elasticity than the first layer, obtains a large mechanical resistance and a high insensitivity to temperature variations within the range from −60° C. to +80° C., in that the thickness of the first layer is from 5 to 20 μm and in that the modulus of elasticity of the second layer is more than 1000 MPa.

7 Claims, 3 Drawing Sheets

OPTICAL FIBER PROVIDED WITH A SYNTHETIC RESIN COATING

FIELD OF THE INVENTION

The invention relates to an optical fiber which is provided with a synthetic resin coating, comprising a glass fiber, a first enveloping layer of a synthetic rubber having a modulus of elasticity of from 0.1 to 10 MPa and a subsequent enveloping layer of a synthetic resin having a modulus of elasticity larger than that of the first layer.

The invention also relates to a method of manufacturing such an optical fiber.

BACKGROUND OF THE INVENTION

Glass fiber for optical telecommunication purposes are generally covered with a synthetic resin coating to prevent mechanical damage. To prevent optical transmission losses caused by microbends a coating consisting of various layers is preferred. For example, the following method is used: Immediately after the glass fiber has been formed, for example by drawing from a preform or using the double crucible method, a first, soft buffer layer of a synthetic rubber is applied having a modulus of elasticity of from 0.1 to 10 MPa. In order to protect the soft buffer layer during further treatments to which the optical fiber is subjected, a second, harder top layer of a synthetic resin is provided having a modulus of elasticity which exceeds 100 MPa. This top layer is also provided immediately after the glass fiber has been formed, i.e. before the fiber is led over a guide wheel or stored. The buffer layer and the top layer together form the primary synthetic resin coating of the glass fiber. A customary value for the diameter of the glass fiber having a primary synthetic resin coating is 250 μm, the diameter of the glass fiber being 125 μm.

To protect the optical fiber from ambient influences during cabling, during layer of the cables and during the life of the cables, the optical fiber is often additionally provided with a thicker secondary synthetic resin coating having a modulus of elasticity exceeding 1 GPa. This secondary synthetic resin coating is not necessarily applied directly after the formation of the glass fiber.

Two embodiments of such a secondary synthetic resin coating are used. In one embodiment, the optical fiber with the primary synthetic resin coating is arranged so as to lie clear off the secondary synthetic resin coating which, hence, forms a tube. The space between the optical fiber and the tube is generally filled with a thixotropic liquid or gel, for example a silicone oil filled with very small quartz particles. It is also possible to accommodate accomodate more than one optical fiber in the tube. In the other embodiment the secondary synthetic resin coating is bonded in an adhesive manner to the primary synthetic resin coating.

In European Patent Application No. EP 155051 which corresponds substantially to U.S. Pat. No. 4,718,748, issued Jan. 12, 1988 and assigned to U.S. Phillips Corporation, a description is given of an optical fiber which is provided with a synthetic resin coating which is formed from a curable synthetic resin composition which is cured by exposure to radiation. The primary synthetic resin coating consists of two layers having moduli of elasticity of from 0.1 to 10 MPa and 100 MPa, respectively. Both layers each have a thickness of approximately 30 μm.

SUMMARY OF THE INVENTION

An object of the invention is to provide an optical fiber which is insensitive to external mechanical influences, for example, transverse forces, on the fiber. The fiber must be largely insensitive to microbending and within the operational temperature range of the fiber (−60° to +80° C.) the mechanical and optical properties must be temperature-independent to the extent possible. Moreover, it is desired to provide an optical fiber, such that the secondary synthetic resin coating can be omitted.

This object is achieved in accordance with the invention by an optical fiber which is provided with a synthetic resin coating and comprises a glass fiber, a first enveloping layer of a synthetic rubber having a modular of elasticity of from about 0.1 to about 10 MPa and a subsequent enveloping layer of a synthetic resin having a modulus of elasticity larger than that of the first layer, which is characterized in that the thickness of the first layer is of from 5 to 20 μm and the modulus of elasticity of the second layer exceeds 1000 MPa. The values of the modulus of elasticity are measured at room temperature.

The high value of the modulus of elasticity of the second layer contributes to the mechanical resistance of the optical fiber. An additional advantage is that materials having a high modulus of elasticity generally also have a high glass transition temperature which may even be beyond the field of application of the optical fiber. This contributes to a small temperature dependence of the optical fiber. A practical upper limit of the modulus of elasticity of isotropic synthetic resins without fillers is 3000 MPa. Filling agents are undesired because filling particles may exert a local pressure on the optical fiber, which leads to transmission losses.

The high value of the modulus of elasticity is generally accompanied by a low value of the coefficient of linear thermal expansion, for example 5 to $20 \times 10^{-5}/°C$. The corresponding values of quartz glass are: $5 \times 10^{-7}/°C$. and of the material of the soft buffer layer: 5 to $40 \times 10^{-5}/°C$. During the cooling of the fiber, for example after the manufacture or during the use of the fiber, the large differences between the coefficients of linear expansion of the quartz glass and the coating may lead to axial bends in the optical fiber which lead to transmission losses. Moreover, differences between the coefficients of expansion of the top layer and the buffer layer in the radial direction may give rise to bonding problems between the optical fiber and the soft buffer layer. Although the coefficient of linear expansion of the synthetic resin coating as a whole is larger than that of the optical fiber which is made from, for example, quartz glass, the buffer layer shrinks so much more quickly than the top layer that the buffer layer can be detached from the fiber.

The invention is based on the recognition that the problems occurring by using an extremely rigid material for the top layer can be overcome by selecting the thickness of the first, soft layer so that it is not too large. A thin first layer provides sufficient protection but, unlike a thick layer, it is always subject to compressive stress and it cannot become detached from the optical fiber by shrinkage. Moreover, bending of the optical fiber caused by temperature variations is counteracted to such an extent that the transmission losses caused by bending are small.

The provision of a thin first layer which has to be provided accurately concentrically about the optical fiber is a process which is difficult to control. A method of measuring and controlling the provision of such a thin layer is described in Netherlands Patent Application No. NL 8701346.

The thickness of the hard top layer is not critical and is preferably selected such that the diameter of the optical fiber with the synthetic resin coating amounts to approximately 250 μm. As the diameter of the quartz glass fiber customarily amounts to 125 μm, this means that the thickness of the top layer is from 40 to 60 μm. A larger thickness of the top layer, such that the total diameter of the fiber with the coating amounts to more than 250 μm leads to larger forces which may bring about a bend in the fiber due to variations in temperature.

A method of manufacturing an optical fiber in accordance with the invention is preferably carried out such that both layers are formed from curable synthetic resin compositions which are applied immediately after the optical fiber has been drawn and which are cured by exposure to electrons or UV light. The fiber in accordance with the invention may alternatively be manufactured using a thermally curable synthetic resin composition.

The problem of providing a hard layer of an unfilled synthetic resin is solved in accordance with the invention in that the second hard layer is formed from a curable synthetic resin composition which comprises ethoxylated bisphenol-A diacrylate, isocyanurate triacrylate and at least a polyurethane acrylate.

In a prefeered embodiment of the method in accordance with the invention the first soft layer is formed from a curable synthetic resin composition which comprises a polyether urethane acrylate. Synthetic resin compositions which can suitably be used for the manufacture of the buffer layer are described in European Patent Application EP NO. 167199 which corresponds substantially to U.S. Pat. No. 4,741,596 issued May 3, 1988 and assigned to U.S. Philips Corporation.

The curable synthetic resin compositinos used for the manufacture of the buffer layer and the top layer may also comprise other components which are known per se, such as monomeric acrylate compounds to increase the curing rate and to adjust the viscosity; light-sensitive initiators if curing is to be carried out by means of exposure to UV light; catalysts and surface active substances.

In European Patent Application No. EP 213684 which corresponds substantially to U.S. Pat. No. 4,733,914 issued Mar. 29, 1988 and assigned to U.S. Philips Corporation, an optical fiber is described the coating of which consists partly of a material which exhibits a high modulus of elasticity in a predetermined preferred direction. In the radial direction the modulus of elasticity is 600 MPa. This material can be used in the secondary and in the primary synthetic resin coating. The thickness of the soft buffer layer is 30 μm.

In U.S. Pat. No. 3,980,390, an optical fiber is described which is coated with a 5 to 10 μm thick layer of a synthetic resin which is thermally cured, after which a large number of layers of a thermoplastic material, for example polythene or nylon, having an overall thickness of 50 to 200 μm is applied by means of melt extrusion. Such materials are considered unsuitable for the manufacture of strong optical fibers which are independent of ambient influences such as temperature and humidity.

BRIEF DESCRIPTION OF THE DRAWING

The invention will be explained in greater detail by means of exemplary embodiments and comparative examples and with reference to the drawing, in which:

FIG. 5 shows the structural formulae of mono and di-2-acryloyl ethoxy phosphate, wherein $x=1$ and $x=2$, respectively, and in which

DETAILED DESCRIPTION OF THE PREFERRED EMBODIMENTS

EXAMPLE 1

Figure 1:
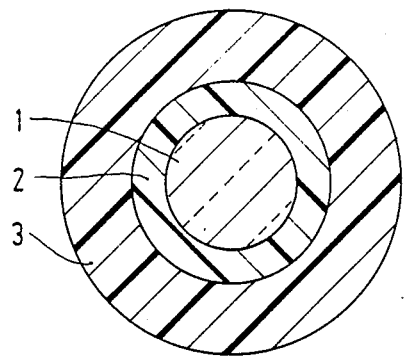
FIG. 1 is a diagrammatic, cross-sectional view of an optical fiber in accordance with the invention.

A multimode glass fiber is formed in known manner by drawing from a preform. A glass fiber is to be understood to mean herein a fiber of glass or quartz glass. The fiber comprises a core glass and a cladding glass having different refractive indices (not shown in FIG. 1). Alternatively, a fiber can be used having a refractive index which varies gradually from the inside outwards, and instead of a fiber drawn from a preform, a fiber can be used which is manufactured by means of the double crucible method. A glass fiber 1 shown in FIG. 1 has a circular cross section (diameter 125 μm) but the cross section may also have any other shape.

Immediately after the glass fiber 1 has been formed, it is provided with a layer of a curable synthetic resin composition which is subsequently cured, thereby forming a buffer layer 2 of a synthetic rubber having a thickness of 11 μm. A method of applying thin layers to an optical fiber is described in U.S. Pat. No. 4,644,898 issued Feb. 24, 1987 and assigned to U.S. Philips Corporation.

Figure 2A:
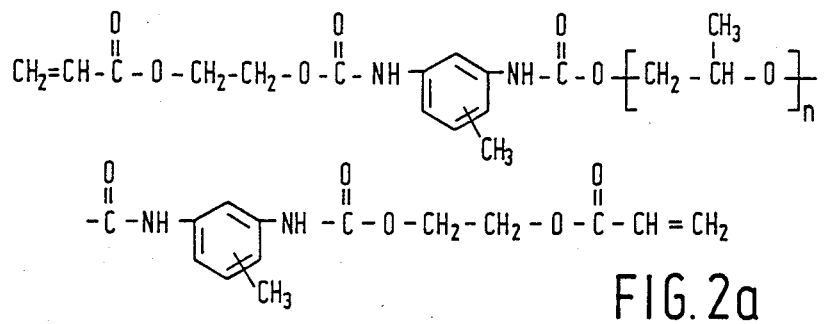
FIGS. 2a-c shows the structural formulae of several polyurethane acrylates.
Figure 3A:
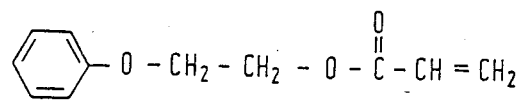
FIGS. 3a-d shows the structural formulae of several monomeric acrylate ester compounds.
Figure 3B:
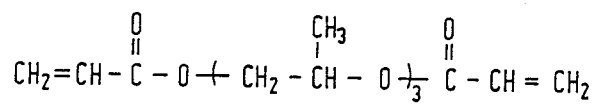
Figure 4A:
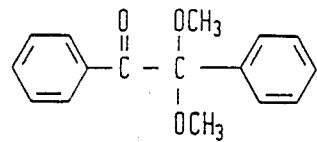
FIGS. 4a-c shows the structural formulae of two light-sensitive initiators.
Figure 5:
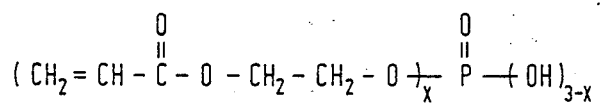

The curable synthetic resin composition contains as the main constituent (68% by weight) a polyether urethane acrylate as described in European Patent Application EP No. 167199, shown in FIG. 2a, wherein has an average value of 120. The curable synthetic resin composition further comprises the reactive monomers 2-phenoxy-ethyl acrylate (20% by weight, see FIG. 3a) and tripropylene glycol diacrylate (6% by weight, see FIG. 3b), the light-sensitive initiator 2,2-dimethoxy-2-phenyl-acetophenone (2% by weight, see FIG. 4a) and p-chloro-benzophenone-2-ethhoxy-ethylacrylate (2% by weight, see FIG. 4a). Finally, the curable synthetic resin composition contains 2% by weight of a mixture of mono and di-2-acryloyl ethoxy phosphate in a molar ratio of 1:1, see FIG. 5. Other curable synthetic resin compositions such as, for example, polysiloxanes, can also suitably be used in the buffer layer of the synthetic resin coating of the glass fiber in accordance with the invention.

The curable synthetic resin composition is made to cure by means of radiation using a high pressure mercury discharge lamp which produces predominantly UV light having wavelengths from 200 to 400 nm and an intensity of 0.27 W/cm$^2$, measured on the synthetic resin layer, during maximally 0.5 s. The curable synthetic resin composition can also be cured in other ways, for example, by exposing it to electron radiation, in which case the curable synthetic resin composition need not comprise a light-sensitive initiator. After curing, the modulus of elasticity of the material of the buffer layer is 1.3 MPa at room temperature. The refractive index is 1.4808. The coefficient of linear expansion is $23 \times 10^{-5}$/°C. at temperatures exceeding −5° C. and decreases at lower temperatures to a value of $10 \times 10^{-5}$/°C. at −60° C.

Figure 2B:
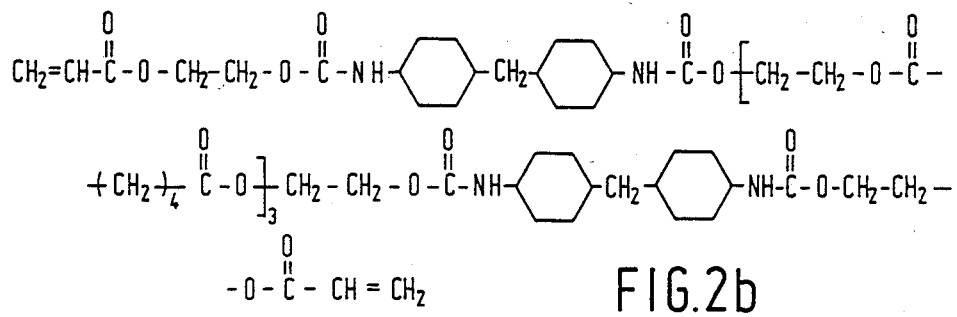
Figure 2C:
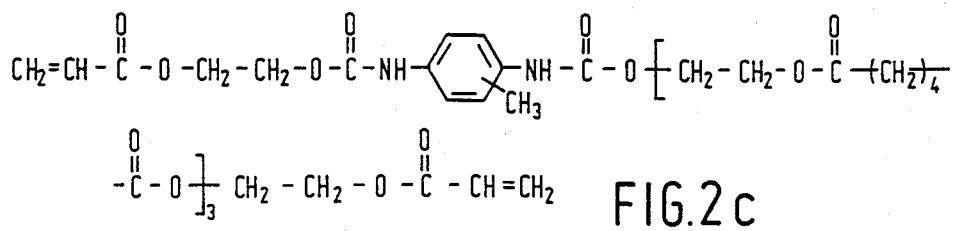
Figure 3C:
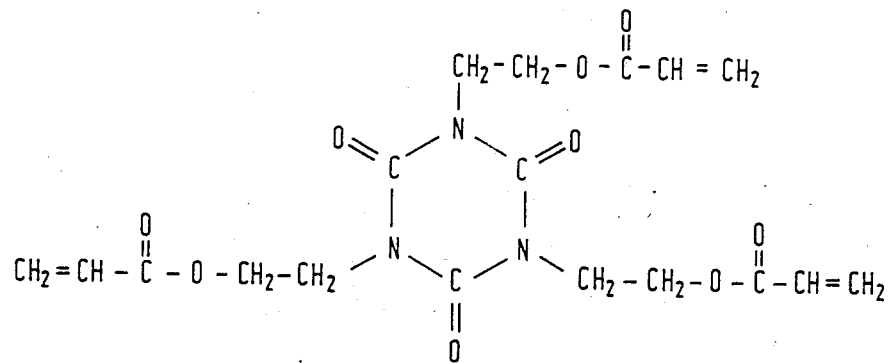
Figure 6:
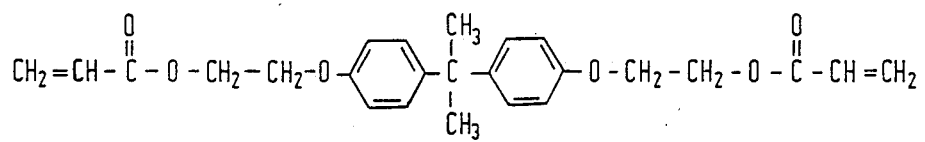
FIG. 6 shows the structural formula of ethoxylated bisphenol-A diacrylate, which compounds can suitably be used in the method in accordance with the invention.

Subsequently, a second layer of a synthetic resin 3 is applied to the fiber (see FIG. 1) in a thickness of 52 μm, by covering the fiber with a curable synthetic resin composition which is subsequently made to cure by exposure to UV light. A suitable synthetic resin composition for this second layer (top layer of the primary synthetic resin coating) comprises 19.1% by weight of a polyester urethane acrylate as shown in FIG. 2b, 23.9% by weight of isocyanurate triacrylate (see FIG. 3c), 4.5% by weight of 2,2-dimethoxy-2-phenylacetophenone (see FIG. 4a) and 52.5% by weight of ethoxylated bisphenol-A diacrylate (see FIG. 6). After curing, the modulus of elasticity of this material is at −60° C.: 1995 MPa, at +20° C.: 1585 MPa and at +80° C.: 501 MPa. The refractive index at 20° C. is 1.5279. The glass transition temperature $T_g$ is approximatey 100° C. The coefficient of linear expansion is $5 \times 10^{-5}$/°C. at temperatures below −5° C. and increases at higher temperatures to a value of $18 \times 10^{-5}$/°C. at +80° C.

The optical fiber thus manufactured, in the present example a multimode fiber, is subjected to a number of tests in which the transmission loss is measured. A compression test is carried out in which a piece of fiber having a length of 0.5 m is clamped between two flat plates with a clamping force of 50 kPa. One of the two plates is provided with 12 grooves having sharp edges. Under these conditions and at a wavelength of light of 850 nm the fiber in accordance with this exemplary embodiment shows the following increase of the losses: 0.38 dB at −60° C., 0.19 dB at +20° C. and 0.18 dB at +80° C.

In the stress-free condition, the transmission loss caused by changes in temperature and expansion is, relative to room temperature is 0.2 dB/km at −60° C. and less than 0.05 dBkm at −55° C. and +80° C.

EXAMPLES 2 AND 3

Optical fibers are manufactured and coated in the same manner as described in Example 1, except that monomode fibers are used. The thickness of the buffer layer is 12 or 19 μm, the thickness of the top layer is 50 or 43 μm, respectively.

In the stress-free condition the transmission loss, caused by changes in temperature relative to room temperature is 0.0 dB/km at −60° C. and +80° C., measured at a wavelength of light of 13.00 nm.

The sensitivity of the optical fiber before it is subjected to transverse forces is measured by winding 150 m of optical fiber on a cylinder, having a diameter of 0.5 m, which is covered with abrasive paper (no. 120). The winding force is 2 N. The increase of the transmission loss as a consequence of this treatment is 0.1 dB/km at wavelengths of light of 1300 nm and 1550 nm, and 0.6 dB/km at 1700 nm, at a thickness of the buffer layer of both 12 μm and 19 μm.

EXAMPLE 4

Figure 3D:
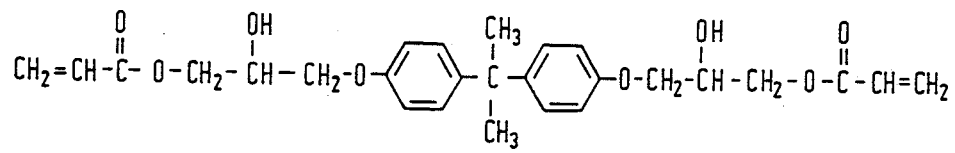
Figure 4B:
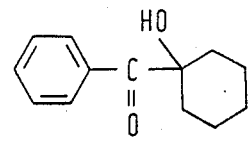
Figure 4C:
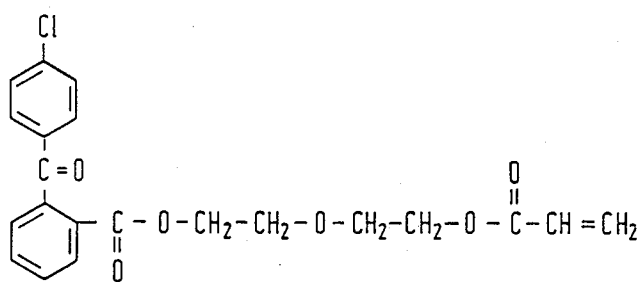

An optical fiber is manufactured and coated in the same way as described in example 1, the thickness of the buffer layer being 8 μm and of the top layer 55 μm. The top layer is made from a curable synthetic resin composition which consists of 10% by weight of a polyester urethane acrylate as shown in FIG. 1c, 18% by weight of isocyanurate triacrylate (see FIG. 3c), 10% by weight of an epoxy acrylate (see FIG. 3d), 4% by weight of 1-hydroxy cyclohexylphenylketone (see FIG. 4b) and 58% by weight of ethoxylated bisphenol-A diacrylate (see FIG. 6). After curing, the modulus of elasticity of this material is 1420 Mpa at room temperature.

COMPARATIVE EXAMPLE 5, NOT IN ACCORDANCE WITH THE INVENTION

A monomode optical fiber is manufactured as described in example 1, except that no buffer layer is applied.

In the stress-free condition the transmission loss, caused by temperature variations relative to room temperature is 0.0 dB/km at −60° C. and +80° C., measured at a wavelength of light of 1300 nm.

The transverse-load sensitivity is measured by means of the abrasive-paper test. The increase of the transmission loss is 1.3 dB/km at a wavelength of light of 1300 nm, 2.0 dB/km at 1550 nm and 3.1 dB/km at 1700 nm.

In this comparative example, the temperature sensitivity of the optical fiber is small, but the transverse-load sensitivity is undesirably large.

COMPARATIVE EXAMPLES 6 AND 7, NOT IN ACCORDANCE WITH THE INVENTION

Multimode optical fibers are manufactured as described in example 1. The thickness of the buffer layer is 27 or 35 μm, the thickness of the top layer is 36 or 27 μm, respectively.

When the fiber having a buffer layer of 35 μm is subjected to a compression test as described in example 1, the tranmission loss is 0.05 dB at room temperature and a wavelength of light of 850 nm.

In the stress-free condition the transmission loss, caused by temperature variations relative to room temperature is, at −60° C. and a wavelength of light of 850 nm, 1.0 dB/km for the optical fiber having a buffer layer of 27 μm and more than 10 dB/km for the fiber having a buffer layer of 35 μm. Both fibers have an additional transmission loss of less than 0.05 dB/km at a temperature of +80° C.

The load sensitivity is small but the fibers in accordance with the present comparative example are sensitive to temperature variations, in particular to cooling, to an undesirably large extent.

COMPARATIVE EXAMPLES 8 AND 9, NOT IN ACCORDANCE WITH THE INVENTION

Monomode optical fibers are manufactured as described in example 1. The thickness of the buffer layer is 24 or 33 μm, the thickness of the top layer is 39 or 30 μm, respectively.

The transverse-load sensitivity of the fiber having a buffer layer of 33 μm is measured by means of the abrasive paper test. The increase of the transmission loss is less than 0.05 dB/km at a wavelength of light of 1300 or 1550 nm, and 0.1 dB/km at 1700 nm.

In the stress-free condition, the transmission loss caused by temperature variations relative to room temperature is, at −60° C. and a wavelength of light of 1300 nm, 0.8 dB/km for the fiber having a buffer layer of 24 μm and more than 4 dB/km for the fiber having a buffer layer of 33 μm. Both fibers have an additional transmission loss of 0.0 dB/km at a temperature of +80° C.

The transverse-load sensitivity is small but the fibers in accordance with this comparative example are sensitive to temperature variations, in particular to cooling, to an undesirably large extent.

COMPARATIVE EXAMPLE 10, NOT IN ACCORDANCE WITH THE INVENTION

A multimode optical fiber is manufactured as described in example 1. The thickness of the buffer layer is 33 μm, the thickness of the top layer is 32 μm. The buffer layer is manufactured from a commercially available synthetic resin composition sold under the trademark DeSolite 039 ® by DeSoto Inc., the top layer is manufactured from DeSolite 042 ® by DeSoto Inc. Both synthetic resin compositions comprise a light sensitive initiator. After curing, the modulus of elasticity of DeSolite 042 ® is at −60° C.: 1585 MPa, at +20° C.: 398 MPa and at +80° C.: 13 MPa.

In the stress-free condition, the transmission loss caused by temperature variations relative to room temperature is, at a wavelength of light of 850 nm, 0.1 dB/km at −60° C. and less than 0.05 dB/km at +80° C.

In a compression test as described in example 1, at a wavelength of light of 850 nm, the additional transmission loss is 0.69 dB at −60° C., 0.21 dB at +20° C. and 0.37 dB at +80° C. The fiber in accordance with this exemplary embodiment has an undesirably large sensitivity to mechanical load.

COMPARATIVE EXAMPLE 11, NOT IN ACCORDANCE WITH THE INVENTION

A monomode optical fiber is manufactured by means of the synthetic resin compositions described in comparative example 10. The thickness of the buffer layer is 32 μm, the thickness of the top layer is 33 μm.

In the stress-free condition, the transmission loss, caused by temperature variations relative to room temperature is, at a wavelength of light of 1300 nm, less than 0.05 dB/km at −60° C. and 0.0 dB/km at +80° C.

The transverse-load sensitivity of the optical fiber is measured by means of the abrasive paper test. The increase of the transmission loss is 1.3 dB/km at a wavelength of light of 1300 nm, 2.7 dB/km at 1550 nm, and 5.5 dB/km at 1700 nm. The fiber in accordance with this exemplary embodiment is very sensitive to transverse loads.

The examples show that an optical fiber having a large resistance to mechanical load and a high insensitivity to temperature variations can only be obtained by using a synthetic resin coating which consists of a top layer having a high modulus of elasticity and a soft buffer layer which must be thin but not inexistent. The critical thickness, which is not to be exceeded depends on the difference in thermal expansion between the buffer layer and the top layer.

What is claimed is:

1. An optical fiber having a synthetic resin coating and comprising a glass fiber, a first enveloping layer of a synthetic rubber having a modulus of elasticity of from 0.1 to 10 MPa, and a second enveloping layer of a synthetic resin having a modulus of elasticity larger than that of the first layer, wherein the thickness of the first layer is of from 5 to 20 μm and the modulus of elasticity of the second layer is more than 1000 MPa.

2. An optical fiber as claimed in claim 1, wherein both layers are formed from curable synthetic resin compositions which are applied immediately after the optical fiber has been drawn and which are made to cure by exposure to electrons or UV light.

3. An optical fiber as claimed in claim 2, wherein the second hard layer is formed from a curable synthetic resin composition which comprises ethoxylated bisphenol-A diacrylate, isocyanurate triacrylate and at least one polyurethane acrylate.

4. An optical fiber as claimed in claim 2, wherein the first soft layer is formed from a curable synthetic resin composition comprising at least one polyether urethane acrylate.

5. An optical fiber as claimed in claim 1 wherein the first layer is formed from a curable synthetic resin composition comprising about 68% by weight of a polyether urethane acrylate, about 20% by weight of 2-phenoxy-ethyl acrylate, about 6% by weight of tripropylene glycol diacrylate, about 2% by weight of 2,2-dimethoxy-2-phenylacetophenone, about 2% by weight of p-chloro-benzpohenone-2-ethoxyethylacrylate and about 2% by weight of a mixture of mono and di-2-acryloyl ethoxy phosphate.

6. An optical fiber as claimed in claim 1 or 5 wherein the second layer is formed from a curable synthetic resin composition comprising about 19.1% by weight of a polyester urethane acrylate, about 23.9% by weight of an isocyanurate tiacrylate, about 4.5% by weight of 2,2-dimethoxy-2-phenylacetophenone, and about 52.5% by weight of ethoxylated bisphenol-A diacrylate.

7. An optical fiber as claimed in claim 1 or 5 wherein the second layer is formed from a curable synthetic resin composition comprising about 10% by weight of a polyester urethane acrylate, about 18% by weight of an isocyanurate triacrylate, about 10% by weight of an epoxyacrylate, about 4% by weight of 1-hydroxycyclohexylphenyl ketone and about 58% by weight of ethoxylated bisphenol-A diacrylate.

* * * * *